(12) United States Patent
Bernini et al.

(10) Patent No.: US 7,515,273 B2
(45) Date of Patent: Apr. 7, 2009

(54) METHOD FOR MEASURING THE BRILLOUIN SHIFT DISTRIBUTION ALONG AN OPTICAL FIBER BASED ON THE OPTICAL DEMODULATION OF THE SIGNALS, AND RELEVANT APPARATUS

(75) Inventors: Romeo Bernini, Rome (IT); Aldo Minardo, Rome (IT); Luigi Zeni, Rome (IT)

(73) Assignee: Consiglio Nazionale Delle Ricerche, Rome (IT)

( * ) Notice: Subject to any disclaimer, the term of this patent is extended or adjusted under 35 U.S.C. 154(b) by 102 days.

(21) Appl. No.: 11/760,931

(22) Filed: Jun. 11, 2007

(65) Prior Publication Data

US 2008/0013096 A1 Jan. 17, 2008

(30) Foreign Application Priority Data

Jun. 9, 2006 (IT) ............... RM2006A0302

(51) Int. Cl.
*G01B 9/02* (2006.01)
*G01N 21/00* (2006.01)
*G02B 6/00* (2006.01)

(52) U.S. Cl. .............. 356/477; 356/73.1; 385/12
(58) Field of Classification Search ........... 356/73.1, 356/477, 483; 385/12
See application file for complete search history.

(56) References Cited

U.S. PATENT DOCUMENTS

| | | | | |
|---|---|---|---|---|
| 6,813,403 B2 * | 11/2004 | Tennyson | ........... | 385/12 |
| 7,170,590 B2 * | 1/2007 | Kishida | ........... | 356/32 |
| 7,245,790 B2 * | 7/2007 | Brown et al. | ........... | 385/12 |
| 2006/0018586 A1 * | 1/2006 | Kishida | ........... | 385/12 |
| 2006/0285850 A1 * | 12/2006 | Colpitts et al. | ........... | 398/108 |
| 2008/0013096 A1 * | 1/2008 | Bernini et al. | ........... | 356/483 |
| 2008/0068586 A1 * | 3/2008 | Kishida et al. | ........... | 356/32 |
| 2008/0145049 A1 * | 6/2008 | Koyamada | ........... | 398/28 |
| 2008/0219300 A1 * | 9/2008 | Krupkin et al. | ........... | 372/6 |

* cited by examiner

*Primary Examiner*—Patrick J Connolly
(74) *Attorney, Agent, or Firm*—Stanislaus Aksman; Roberts Mlotkowski Safran & Cole, P.C.

(57) ABSTRACT

The invention concerns a method for measuring the Brillouin shift distribution in optical fiber, comprising the launch of an optical pump signal from one end of the measurement fiber and an optical probe signal from the other end of the fiber, including: measuring frequency and phase components over a predeterminable number of frequency shifts between the optical carrier of the probe signal and the optical carrier of the pump signal and obtaining the corresponding transfer functions; and elaborating the transfer functions in order to reconstruct the Brillouin shift distribution along the measurement fiber.

15 Claims, 3 Drawing Sheets

METHOD FOR MEASURING THE BRILLOUIN SHIFT DISTRIBUTION ALONG AN OPTICAL FIBER BASED ON THE OPTICAL DEMODULATION OF THE SIGNALS, AND RELEVANT APPARATUS

CROSS REFERENCE TO RELATED APPLICATION

The present Application claims priority from Italian Application No. RM2006A000302 filed on Jun. 9, 2006, which is hereby incorporated by reference in its entirety into the present Application.

FIELD OF THE INVENTION

The present invention concerns a technique for measuring the Brillouin shift distribution along an optical fiber based on the optical demodulation of the signals, and relevant apparatus.

More in detail, the method of the present invention uses a particular optical demodulation of the signals that allow obtaining measurements of the Brillouin shift distribution, with high resolution and accuracy. The present invention concerns further an apparatus that implements such a technique, which is more economical with respect to the apparatuses for distributed measurement of the Brillouin shift based on the traditional technique.

BACKGROUND OF THE INVENTION

As described, for example, by J. Dakin and B. Culshaw in "optical fiber sensors", Artech House, Boston, 1997, the sensors distributed in the optical fiber which are based on the effect of Stimulated Brillouin Scattering (SBS), have gained in last years an important role in different field of application, as for example in the field of structure monitoring or in the field of environment monitoring. Such a success is due mostly to the unique possibility that these sensors offer to carry out measurements of the physical quantity of interest (temperature and/or strain), with continuity and over long distances. Such sensors therefore proves as indispensable instruments whenever one requires a high number of measurement points, which have to be spatially distributed over long distances. In such cases, the use of sensors based on the SBS effect allow using an only optical fiber as sensing element, which provides simultaneously an amount of information which is comparable with that obtainable using hundreds or thousands of point-like sensors. The advantages reside in the low cost, and in the immunity to the electromagnetic interferences of the optical fiber used as element that is sensible to the quantity of interest.

As described for example in G. P. Agrawal, "Non-linear fiber optics", Academic Press, Boston, 1989, the SBS effect origins from the interaction, along the optical fiber, between two counter-propagating optical waves with carrier frequencies that differ of a quantity $\nu$, and of an acoustic wave at $\nu$ frequency. The acoustic wave at issue is generated directly by the two optical waves, by means of a process of electrostriction connected to the nature of the material of which the optical fiber is constituted (silica glass). More precisely, the interferential pattern generated by the spatial superposition of the two optical waves along the fiber generates, within the same optical fiber, zones of high field intensity, which compress due to the electrostriction effect. The last consists in the strain of a dielectric immersed in an electrical field.

The alternation of zones of higher and lower density is able to activate the generation of a coherent acoustic wave, provided that a condition of resonance between the propagation speed of the acoustic waves in the fiber and the speed of the interferential pattern movement along the fiber is verified. Since this last speed depends essentially on the frequency shift between the two counter-propagating optical waves along the fiber, the intensity of the generated acoustic wave will depend indeed on such a $\nu$ shift. The value of the frequency shift between the two optical signals for which one has the maximum intensity of the generated acoustic wave is called "Brillouin frequency shift". The magnitude of such a shift is linked, as mentioned above, to the speed with which the acoustic waves propagate along the medium (the optical fiber in our case of interest), and is therefore a characteristic parameter of the fiber. Once supposed that the resonance condition of the frequency shift between the two optical signals is satisfied, the acoustic wave so generated acts as a "scattering" element with respect to the optical radiation at higher frequency, which is called pump radiation. The scattering of the pump wave, caused by the acoustic wave generated by electrostriction (the Brillouin stimulated scattering), produces a transfer of power from the pump wave the to the optical wave at lower frequency, that is called probe wave.

Therefore, after all, the stimulated Brillouin scattering will result in a transfer of energy from the pump wave to the probe wave, which will be all the stronger the closer the frequency shift between the pump wave and the probe wave is to the Brillouin shift of the optical fiber. Since the Brillouin shift depends on the elastic characteristics of the material (density and elasticity modulus), it will depend on the temperature conditions and strain to which the same fiber is subjected. This dependency enables to use the measurement systems of the Brillouin shift within temperature and strain sensors.

The use of suitable interrogation techniques allows effectuating the distributed measurements, i.e. to spatially resolve along the fiber the whole Brillouin shift distribution. The most common technique is based on the use of a pulsed pump signal, and of a continuous wave (CW) probe signal. The principle is similar to that of reflectometry in the time domain: one acquires in the time domain the probe signal received by one end of the fiber, starting from the launching instant of the pump impulse, the last being launched from the same end. In such a way, being known the speed of propagation of the pump impulse along the fiber, it is possible to correlate the arrival instant of the probe signal with the position of the fiber in which that signal has interacted with the pump impulse. By measuring the probe signal amplification as a function of the time and frequency shift between the pump wave and the probe wave, it is possible to derive the Brillouin shift value for each position along the fiber. The spatial resolution of the measurement depends essentially on the time duration of the used pump impulse: the longer is the impulse, the smaller will be the resolution with which the Brillouin shift along the measurement fiber is measured.

The poor signal-to-noise ratio associated to such measurement type, which essentially depends on the weak coupling between the pump light and the probe light, has driven towards the introduction of alternative detection techniques. A detection method which is very efficient is the one that operates in the frequency domain, and is described for example in D. Garus, T. Gogolla, K. Krebber, F. Schliep, "Brillouin optical-fiber frequency-domain analysis for distributed temperature and strain measurements", J. Lightwave Technol., 15, 654-662 (1997). In such a type of interrogation technique, called BOFDA (Brillouin Optical Frequency-Domain Analysis), the measurement of the Brillouin shift is effectuated by launching in the fiber a continuous wave (CW) probe signal on one side, and a pump signal on the other side whose intensity is constituted by a CW component with a superposed sinusoidal component at a certain frequency. This technique comprises the measurement of the sinusoidal component at the same frequency, induced on the probe signal coming out from the fiber. Such a component must be measured in phase and modulus, with varying modulation frequency. In the end, what is measured is a complex transfer function, which represents the SBS interaction in the fiber between the pump light and the probe light, for a certain value of the frequency shift between the optical carriers of these two signals. In first approximation, such as transfer function can be correlated to the impulsive response of the system by a simple Fourier transform relationship. Therefore, once the data in the frequency domain are acquired, the last can be anti-transformed and then elaborated so as to derive the Brillouin shift distribution along the fiber.

Figure 1:
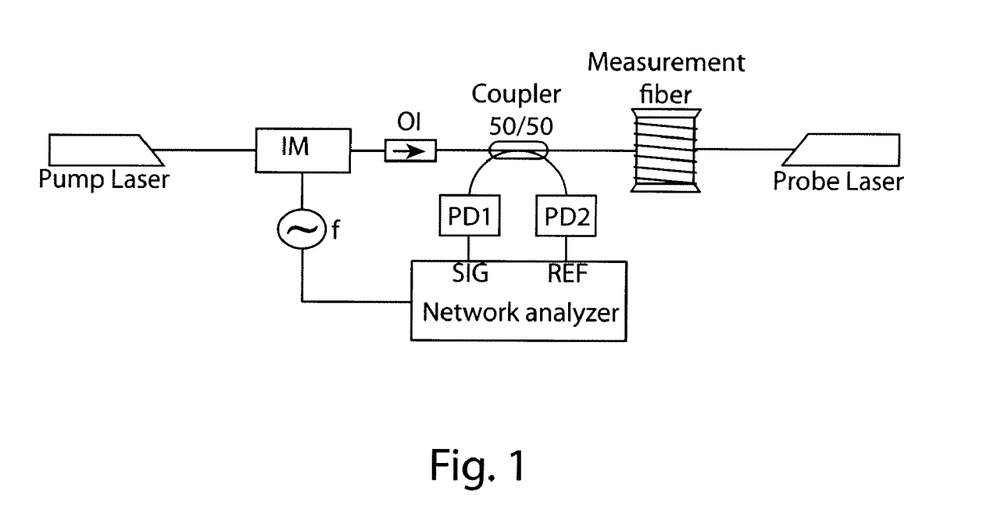
FIG. 1 shows the block diagram of the Brillouin shift measuring setup, based on the BOFDA technique.

A possible measurement setup which implements the BOFDA technique is represented in FIG. 1. As clear from the figure, the pump signal is intensity modulated at the frequency f by means of the optical modulator of intensity IM. The acquisition of the AC component at frequency f, which is present on the probe signal at the output of the fiber, is carried out by means of a vectorial network analyzer, which uses the intensity of the modulated pump signal as a reference. The optical/electric conversion of the signals is carried out by means of two photodiodes PD1 and PD2. On the basis of these two signals, the analyzer calculates modulus and the phase of the transfer function at modulation frequency f. Once carried out the measurement of the complex transfer function for a suitable range of frequencies f, such measurement is repeated several time with varying shift between the optical carrier of the pump signal and the optical carrier of the probe signal, so as to obtain a certain number of transfer functions suitable for the reconstruction of the Brillouin shift distribution along the measurement fiber.

The main advantage offered by the BOFDA technique, with respect to the traditional measurement techniques which operate in the time domain, consists in the fact that the measurements are carried out in the synchronous modality, and this will result in a better signal-to-noise ratio. However, the highest spatial resolution which is obtainable by means of the BOFDA technique is connected to the bandwidth with which the measurements in the frequency domain are acquired. By virtue of the necessity to obtain an always higher spatial resolution, it is appropriated to have the possibility of operating with the most possible large bandwidth. For example, the spatial resolution of a meter requires a functioning bandwidth, both of the network analyzer used for the calculation of the transfer function and the photodiodes used for the optical/electrical conversion of the signals, of around 100 MHz. The use of wide-band instrumentation, on one hand, will result in a higher cost of the apparatus which implements the measurement technique, and, on the other hand, the use of large-band photodiodes entails a higher quantity of noise in the measured data.

SUMMARY OF THE INVENTION

It is object of the present invention to provide a method for measuring the Brillouin shift distribution which overcomes the drawbacks and solves the problems of the prior art.

It is further specific object of the present invention to provide an apparatus which implements the method object of the invention.

It is subject-matter of the present invention a method for measuring the Brillouin shift distribution in optical fiber, comprising the launch of an optical pump signal from one end of the measurement fiber and an optical probe signal from the other end of the fiber, characterized in that it comprises the following steps:

A. launching a pump signal with an intensity that is sum of a continuous component and a sinusoidal component at frequency $f_1$, $I_{Pompa}(z=0,t)=I_{Pu0}(1+m_1 \cos(2\pi f_1 t+\phi_1))$, and an optical probe signal with an intensity which is sum of a continuous component and a sinusoidal component at frequency $f_2$, $I_{Probe}(z=L,t)=I_{Pr0}(1+m_2 \cos(2\pi f_2 t+\phi_2))$, said two frequencies $f_1$ and $f_2$ differing of a predefinable quantity $f_m$ such that:

$$f_1-f_2=f_m \text{ and } f_m <<f_1,f_2$$

L representing the total length of the measurement fiber, whilst $\phi_1$ and $\phi_2$ are two initial arbitrary phases, holding moreover the following relationship: $m_1, m_2 <<1$;

B. measuring of the component at frequency $f_m$ which is present in the intensity spectrum of the probe signal at the exit of the measurement fiber, C. repeating the phases A and B with varying $f_1$ and $f_2$ frequencies, with the above-mentioned constraints;

D. repeating the phases from A to C, for a pre-determinable number of shifts at frequency $\nu_i$, $i=1,\ldots,N_{shift}$, between the optical carrier of the probe signal and the optical carrier of the pump signal, and obtaining the correspondent transfer functions $H(f,\nu_i)$ at frequency $f \approx f_1 \approx f_2$;

E. elaborating the transfer functions obtained at the end of step D, in order to reconstruct the Brillouin shift distribution along the measurement fiber.

It is further specific subject-matter of the present invention a method for measuring the Brillouin shift distribution in optical fiber, comprising the launch of an optical pump signal from one end of the measurement fiber and an optical probe signal from the other end of the fiber, characterized in that it comprises the following steps:

A'. launching a pump signal with an intensity that is sum of a continuous component and a sinusoidal component at frequency $f_1$, $I_{Pompa}(z=0,t)=I_{Pu0}(1+m_1 \cos(2\pi f_1 t+\phi_1))$, and an optical probe signal with an intensity constituted by a continuous component, $I_{Probe}(z=L,t)=I_{Pr0}$, L representing the total length of the measurement fiber, while $\phi_1$ is an initial arbitrary phase, holding moreover the following relationship: $m_1 <<1$;

AA'. modulating in intensity, at frequency $f_2$, the probe signal as it is at the exit of the measurement fiber at z=L in step A', $f_2$ differing from frequency $f_1$ of a fixed pre-definable quantity $f_m$ such that:

$$f_1-f_2=f_m \text{ and } f_m <<f_1,f_2$$

B. measuring the component at frequency $f_m$ which is present in the intensity spectrum of the probe signal at the exit of the measurement fiber, C. repeating steps A' to B with varying $f_1$ and $f_2$ frequencies, with the above-mentioned constraints;

D. repeating steps A' to C, for a pre-determinable number of shifts at frequency $\nu_i$, $i=1,\ldots,N_{shift}$, between the optical carrier of the probe signal and the optical carrier of the pump signal, and obtaining the correspondent transfer functions;

E. elaborating the transfer functions obtained at the end of step D, in order to reconstruct the Brillouin shift distribution along the measurement fiber.

It is further specific subject-matter of the present invention a method for measuring the Brillouin shift distribution in optical fiber, comprising the launch of an optical pump signal from one end of the measurement fiber and an optical probe signal from the other end of the fiber, characterized in that it comprises the following steps:

A1. launching a pump signal with an intensity that is sum of a continuous component and a sinusoidal component at frequency $f_1$, $I_{Pompa}(z=0,t)=I_{Pu0}(1+m_1 \cos(2\pi f_1 t+\phi_1))$, and an optical probe signal with an intensity that is sum of a continuous component and two sinusoidal components at frequencies $f_2$ and $f_3$, $I_{Probe}(z=L,t)=I_{Pr0}(1+m_2 \cos(2\pi f_2 t+\phi_2)+m_3 \cos(2\pi f_3 t+\phi_3))$, said three frequencies $f_1$, $f_2$ and $f_3$ related by the following relations:

$$f_2=f_1-f_m, f_3=f_1+f_m \text{ and } f_{m\,<<f1,f2}$$

L representing the total length of the measurement fiber, whilst $\phi_1$, $\phi_2$ and $\phi_3$ are three initial arbitrary phases, holding moreover the following relationship: $m_1, m_2, m_3 << 1$;

B. measuring the component at frequency $f_m$ which is present in the intensity spectrum of the probe signal at the exit of the measurement fiber, C. repeating steps A1 to B with varying the $f_1$ frequency, with the above-mentioned constraints;

D. repeating steps A1 to C, for a pre-determinable number of shifts at frequency $v_i$, $i=1, \ldots, N_{shift}$, between the optical carrier of the probe signal and the optical carrier of the pump signal, and obtaining the correspondent transfer functions;

E. elaborating the transfer functions obtained at the end of step D, in order to reconstruct the Brillouin shift distribution along the measurement fiber.

Preferably according to the invention, the elaboration in step E is carried out by Fourier anti-transforming operations and subsequent fitting with theoretical curves of Lorenzian type.

Preferably according to the invention, in step C one uses a number $N_f$ of modulation frequencies $f_1$ and $f_2$, that is:

$$f_1=\{f_{1i}\}_{i=0,1,\ldots N_f-1}$$

$$f_2=\{f_{2i}\}_{i=0,1,\ldots N_f-1}$$

where:

$$f_{1i}=f_{min}+i\Delta f\, i=0,1,\ldots N_f-1$$

$$f_{2i}=f_{1i}+f_m\, i=0,1,\ldots N_f-1$$

where $\Delta f$ is a predefinable quantity.

Preferably according to the invention, $\Delta f$ must satisfy the relationship:

$$\Delta f < \frac{v}{2L}$$

where v is the propagation speed of the optical signals in the fiber, and L is the fiber length.

Preferably according to the invention, the highest and lowest frequencies used in step C, $f_{max}$ and $f_{min}$, define the maximum spatial resolution $\Delta z$ with which the distributed measurement of the Brillouin shift is carried out, according to the formula:

$$\Delta z = \frac{v}{2}\frac{1}{f_{max}-f_{min}}$$

It is further specific subject-matter of the present invention an optoelectronic measurement apparatus for distributed measurements of the Brillouin shift in optical fiber, characterized in that it implements the method subject-matter of the invention, and in that it comprises:

a laser for the generation of the optical pump signal;

a tunable laser for the generation of the probe optical signal;

a first optical modulator of intensity, for the modulation at frequency $f_1$ of the pump signal;

a second optical modulator of intensity, for the modulation at frequency $f_2$ of the probe signal before the launch in the fiber;

two radio-frequency generators for the two steering of modulators;

a lock-in amplifier;

a radio-frequency mixer for the generation of the reference signal at low-frequency $f_m=f_1-f_2$.

It is further specific subject-matter of the present invention an optoelectronic measurement apparatus for distributed measurements of the Brillouin shift in optical fiber, characterized in that it implements the method subject-matter of the present invention, and in that it comprises:

a laser for the generation of optical pump signal;

a tunable laser for the generation of the probe optical signal;

a first optical modulator of intensity, for the modulation at frequency $f_1$ of the pump signal;

a second optical modulator of intensity, for the modulation at frequency $f_2$ of the probe signal before the launch in the fiber;

two radio-frequency generators for the steering of the two modulators;

a lock-in amplifier;

a radio-frequency mixer for the generation of the reference signal at low-frequency $f_m=f_1-f_2$.

It is further specific subject-matter of the present invention an optoelectronic measurement apparatus for distributed measurements of the Brillouin shift in optical fiber, characterized in that it implements the method subject-matter of the invention, and in that it comprises:

a laser (PMP) for the generation of the optical pump signal;

a tunable laser (PRO) for the generation of the probe optical signal;

a first optical modulator of intensity (IM1), for the modulation at frequency $f_1$ of the pump signal;

a second optical modulator of intensity (IM2), for the simultaneous modulation at frequencies $f_2$ and $f_3$ of the probe signal before the launch in the fiber;

a radio-frequency generator for the steering of modulator (IM1);

a lock-in amplifier (LI);

a radio-frequency mixer (RFM) for the generation of the two modulating frequencies $f_2$ and $f_3$ steering the modulator (IM2).

Preferably according to the invention, it further comprises:
an optical isolator;
an optical circulator;
low-frequency photodiode.

BRIEF DESCRIPTION OF THE DRAWINGS

The present invention will be now described, by way of illustration but not by way of limitation, according to its preferred embodiments, with particular reference to the figures of the enclosed drawings, wherein.

DETAILED DESCRIPTION

The Inventors have developed a technique for the measurement of the Brillouin shift distribution along an optical fiber, which is based on the optical demodulation of the Brillouin signals. The technique can be realized according to three embodiments.

In the first embodiment, a probe signal modulated in intensity at frequency $f_2$ and a pump signal modulated in intensity at frequency $f_1$ are launched in the fiber.

In the second embodiment, a continuous wave probe signal and an optical signal modulated intensity at frequency $f_2$ are used, while the probe signal which comes back from the fiber is subsequently optically demodulated by means of intensity modulation at frequency $f_1$.

In the third embodiment, a pump signal modulated in intensity at frequency $f_1$ and a probe signal modulated in intensity simultaneously at frequencies $f_2=f_1-f_m$ and $f_3=f_1+f_m$, In any cases, the technique comprises the measurement of the spectral component at frequency $f_m=f_1-f_2$ on the resulting probe signal. Such a component represents a measurement of the SBS transfer function of the measurement fiber at frequency $f \approx f_1 \approx f_2$. Therefore, starting from the measurement of the component at fixed frequency $f_m$, carried out with varying $f_1$ and $f_2$ (but keeping constant the difference $f_1-f_2$), the whole SBS transfer function can be reconstructed. Such a measurement can be then repeated for a certain number of frequency shifts between the optical carrier of the pump light and the optical carrier of the probe light.

The main advantage of the technique that is subject-matter of the present invention lies in the fact that the acquired component, being at low-frequency:

$$f_1-f_2=f_m \quad (1)$$

$$f_m \ll f_1, f_2 \quad (2)$$

can be measured in modulus and phase by using, in cascade, a photodiode at low-frequency, followed by a lock-in reading amplifier. According to the first two embodiments of the present invention, the lock-in amplifier, besides receiving at the input the electrical signal which comes out from the photodiode, will receive a reference electrical signal at frequency $f_m=f_1-f_2$ obtained for example by means of a radio-frequency mixer. Instead, according to the third embodiment, the local oscillator electrical output of the lock-in amplifier is also used, for the generation of frequencies $f_2$ and $f_3$. In any cases, the digital output of the lock-in amplifier can therefore be transferred to a PC connected to the same lock-in amplifier. Once a certain number of transfer functions are acquired, which are obtained with varying frequency shift between pump light and probe light, it is possible to elaborate such complex functions so as to reconstruct the whole Brillouin shift distribution along the optical fiber.

A mathematical description of the measurement technique that is subject-matter of the present invention can be obtained from the coupled equations which describes the SBS interaction in the optical fiber between an optical pump signal and an optical probe signal, provided for example in G. P. Agrawal, "Non-linear fiber optics", Academic Press, Boston, 1989:

$$\left(\frac{1}{v}\frac{\partial}{\partial t} + \frac{\partial}{\partial z}\right)I_{Pump} = -g(z,\nu)I_{Pu}I_{Probe} - \alpha I_{pump} \quad (3)$$

$$\left(\frac{1}{v}\frac{\partial}{\partial t} - \frac{\partial}{\partial z}\right)I_{Probe} = g(z,\nu)I_{Pump}I_{Probe} - \alpha I_{Probe} \quad (4)$$

In equations (3-4), $I_{Pump}$ and $I_{Probe}$ represent respectively the intensity of the pump signal and of the probe signal, the coefficient $\alpha$ represents the optical attenuation in the fiber, g is the Brillouin gain coefficient which describes a coupling between the two signals due to the SBS effect, z is the spatial co-ordinate along the fiber, $\nu$ is frequency difference between the optical carrier of the pump signal and the optical carrier of the probe signal. As stressed as in the relations (3,4), the Brillouin gain coefficient g is in general a function of both the shift between the pump frequency and the probe frequency, $\nu$, and the position along the fiber, z.

In the conditions imposed by the first embodiment of the technique which is subject-matter of the invention, the boundary conditions to be considered for the equations (3,4) corresponds to the launch of the pump signal and of the probe signal at the opposite sides of the fiber, modulated in intensity respectively at frequency $f_1$ and $f_2$, i.e.:

$$I_{Pump}(z=0,t)=I_{Pu0}(1+m_1\cos(2\pi f_1 t+\phi_1)) \quad (4a)$$

$$I_{Probe}(z=L,t)=I_{Pr0}(1+m_2\cos(2\pi f_2 t+\phi_2)) \quad (5)$$

In these two relationships, L represents the whole length of the measurement fiber, whilst $\phi_1$ and $\phi_2$ are two arbitrary initial phases. Here one makes the hypothesis of small modulation depths, i.e. $m_1$, $m_2 \ll 1$. Moreover, the two $f_1$ and $f_2$ frequencies are such as to satisfy in every case the relationships (1,2). When the frequency shift between the two carriers, $\nu$, is such as not to fall within the Brillouin gain bandwidth for any position along the measurement fiber, the g coefficient is identically equal to zero along the whole fiber, i.e. for $0<z<L$. In such a case, the two pump and probe waves conterpropagate along the fiber, at speed $\pm v$, without coupling with each other, so that the probe light coming out from the fiber, i.e. at $z=0$, will have an intensity constituted by a continuous component with a superposed small component at frequency $f_2$. In such conditions, the electrical signal sent to the lock-in amplifier will not present any spectral component at frequency $f_m=f_1-f_2$, so that the measured transfer function will be identically null.

Vice versa, when the frequency shift between the pump and the probe, $\nu$, is such that the Brillouin gain coefficient g is greater than zero at least for some positions z along the fiber, the forcing term at the right-hand side of the equation (4) ($g \cdot I_{pump} \cdot I_{probe}$) will results different from zero for these positions. Since $I_{pump}$ comprises a spectral component at frequency $f_2$, the product between these two signals will comprise some frequency term ($f_1+f_2$), plus a difference frequency term ($f_1-f_2$)

Such frequencies will therefore sum up to the spectrum of the probe signal, as soon as such signal propagates in the positions of the fiber for which g turns out to be different from zero.

By measuring, in modulus and phase, the difference frequency ($f_m$) component, which is present on the probe signal coming out from the fiber, it is possible to obtain an information equivalent to that derived in the traditional BOFDA technique, as soon as one works with a continuous wave probe signal and a pump signal modulated at frequency $f_1$. Such a measurement will be carried out for a number $N_f$ of modulation frequencies $f_1$ and $f_2$, i.e.:

$$f_1 = \{f_{1i}\}_{i=0,1,\ldots N_f-1} \quad (6)$$

$$f_2 = \{f_{2i}\}_{i=0,1,\ldots N_f-1} \quad (7)$$

where:

$$f_{1i} = f_{min} + i\Delta f \; i=0,1,\ldots N_f-1 \quad (8)$$

$$f_{2i} = f_{1i} + f_m \; i=0,1,\ldots N_f-1 \quad (9)$$

Therefore, the frequencies $f_1$ and $f_2$ and $f_1$ are made vary within a suitable range, keeping constant their difference. The step $\Delta f$; i.e. the frequency distance between two subsequent frequencies $f_{1i}$, which is in turn equal to the frequency distance between two subsequent frequencies $f_{2i}$, has to be chosen on the basis of the length L of the measurement fiber. As described in D. Garus, T. Gogolla, K. Krebber, F. Schliep, "Brillouin optical-fiber frequency-domain analysis for distributed temperature and strain measurements", J. Lightwave Technol., 15, 654-662 (1997), the sampling for an only frequency, aimed at measuring the transfer function, is carried out with a $\Delta f$ which has to satisfy the relation:

$$\Delta f < \frac{v}{2L} \quad (10)$$

where v is the propagation speed of the optical signals in the fiber, and L is the fiber length. Moreover, the frequencies $f_{max}$ and $f_{min}$ define the highest spatial resolution $\Delta z$ with which the Brillouin shift distributed measurement is carried out.

By simply applying the Nyquist rule, one obtains:

$$\Delta z = \frac{v}{2} \frac{1}{f_{max} - f_{min}} \quad (11)$$

This sampling is used according to the invention for two different frequencies as above explained.

By carrying out a scanning of the frequencies within the chosen range, therefore, one derives the transfer function H(f,v), where:

$$H(f,v) = \hat{I}_{probe}(f_m,v) \quad (12)$$

where $f \approx f_1 \approx f_2$, $f_m = f_1-f_2$, and $\hat{I}_{probe}(f_m,v)$ represents the component at frequency $f_m$ of the probe signal spectrum, measured at z=0, and for a frequency shift between the pump and the probe equal to v.

The whole described procedure must be repeated for a suitable number of frequency shifts between the pump and the probe, v. Such a shift can be varied by acting on the emission frequency of the tunable laser used in the generation of the probe signal. At the end of the measurement step a certain number of transfer of functions $H_i(f,v_i=1\ldots N_{Shift})$ will therefore be at disposal, with $N_{Shift}$ equal to the number of the shifts between the pump frequency and the probe frequency used for the measurement. At this point, the transfer functions can be elaborated in order to reconstruct the whole Brillouin shift distribution along the measurement fiber. The elaboration can take place preferably, but not exclusively, using the traditional reconstruction techniques adopted in the BOFDA systems, based on the transformation of the measured data from the frequency domain to the time domain, by means of Fourier anti-transform operation.

The technique subject-matter of the present invention can be carried out even in a second embodiment, wherein the demodulation operation at low frequency of the probe signal takes place forward to the SBS interaction with the pump signal. In particular, the boundary conditions adopted in this case are:

$$I_{Pump}(z=0,t) = I_{Pu0}(1+m_1\cos(2\pi f_1 t + \phi_1)) \quad (13)$$

$$I_{Probe}(z=L,t) = I_{Pr0} \quad (14)$$

i.e., a pump signal modulated in intensity at frequency $f_1$ and a continuous wave probe signal are launched at opposite ends of the measurement fiber.

Even in this case, the measurement is carried out for a certain value of the frequency shift between the optical carrier of the two signals, v. If for the chosen value of v there is no SBS interaction along the fiber, the probe signal will still have a time-constant intensity. Vice versa, if v is such that, at least for some positions z along the fiber, there is SBS interaction along the fiber, the forcing term at the right-hand side of the equation (4) ($g \cdot I_{pump} \cdot I_{probe}$), will act so that the probe signal will acquire a component at frequency $f_1$.

In any case, the technique provides that the probe signal, taken out at the exit of the fiber (z=0), is subsequently modulated in intensity at frequency $f_2$, with $f_1$ and $f_2$ satisfying the relations (1-2). Then, the signals so modulated will have a frequency component $f_1-f_2$ only if there has been Brillouin interaction along the fiber. For this signal, the same relationship (12) as seen above applies, i.e. the component measured at frequency $f_m$ represents the value of the transfer function at frequency $f \approx f_1 \approx f_2$.

The technique subject-matter of the present invention can be carried out even in the above third embodiment, wherein the probe signal is intensity-modulated with an RF signal composed of two components, at frequencies $f_2 = f_1-f_m$ and $f_3 = f_1+f_m$. In particular, the boundary conditions adopted in this case are:

$$I_{Pump}(z=0,t) = I_{Pu0}(1+m_1\cos(2\pi f_1 t + \phi_1)) \quad (15)$$

$$I_{Probe}(z=L,t) = I_{Pr0}(1+m_2\cos(2\pi f_2 t + \phi_2) + m_3\cos(2\pi f_3 t + \phi_3)) \quad (16)$$

i.e., the pump signal and the probe signal are launched at opposite ends of the measurement fiber.

Even in this case, the measurement is carried out for a certain value of the frequency shift between the optical carrier of the two signals, v. If for the chosen value of v there is no SBS interaction along the fiber, the probe signal, at the exit of the fiber, will have no component at frequency $f_m$. Vice versa, if v is such that, at least for some positions z along the fiber, there is SBS interaction along the fiber, the forcing term at the right-hand side of the equation (4) (g·$I_{pump}$·$I_{probe}$), will act so that the probe signal will acquire a component at frequency $f_m$.

Hence, the probe signal will have a frequency component $f_m$ only if there has been Brillouin interaction along the fiber. For this signal, the same relationship (12) as seen above applies, i.e. the component measured at frequency $f_m$ represents the value of the transfer function at frequency $f \approx f_1 \approx f_2 \approx f_3$.

Even in this case, one will have to acquire a certain number of transfer functions $H_i(f, v_i)$, one for each value of the chosen shift at frequency $v_i$. The transfer functions so acquired will be suitable to be elaborated in such a way to obtain a reconstruction of the Brillouin shift along the fiber, by using for example the classical technique of reconstruction described in D. Garus, T. Gogolla, K. Krebber, F. Schliep, "Brillouin optical-fiber frequency-domain analysis for distributed temperature and strain measurements", J. Lightwave Technol., 15, 654-662 (1997), and here reported by the reference.

The reconstruction technique at issue is based on the transformation of the collected data from the frequency domain to the time domain, by means of an anti-transform Fourier operation. The signals so obtained represent the impulsive SBS responses taken for different values of the shift between pump frequency and probe frequency, i.e.:

$$h_i(t) = \Im^{-1}(H(f,v_1)) \; i=1,2, \ldots N_{Shift} \quad (17)$$

The time variable in the relationship (17) can be easily converted into spatial variable z, once the propagation speed v of the light in the fiber is known, that is it holds the relationship z=tv/2. Once obtained the impulsive responses, it is sufficient collecting such data and evaluating, for each position z along the fiber, the value of the responses with varying v. The progression of $h(\bar{z},v_i)$, measured for a certain position $\bar{z}$ and with varying $v_i$, has a theoretical progression of the Laurentian type, with a peak central frequency equal to the value of the Brillouin shift at the position $\bar{z}$. Therefore, by means of fitting operation between the spectrum measured in each position of the fiber, and the theoretical spectrum of the Laurentian type, it is possible to reconstruct the whole distribution of the Brillouin shift along the fiber.

The inventors have moreover developed an optoelectronic apparatus which implements the distributed measurement technique of the Brillouin shift according to the invention, in its three embodiments.

Figure 2:
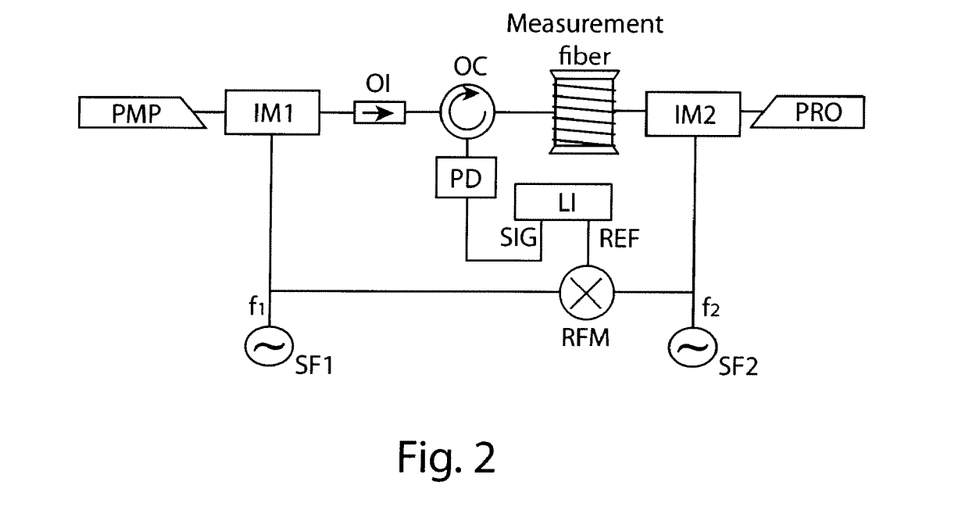
FIG. 2 shows the block diagram of the Brillouin shift measuring setup, based on the technique according to the invention, in its first embodiment.

The setup of the apparatus which implements the method of the invention in its first embodiment is shown in FIG. 2. The setup provides:

a PMP laser for the generation of optical pump signal;
a PRO tunable laser for the generation of the probe optical signal;
a first optical modulator of intensity IM1, for the modulation at frequency $f_1$ of the pump signal;
a second optical modulator of intensity IM2, for the modulation at frequency $f_2$ of the probe signal before the launch in the fiber;
two radio-frequency generators for the steering of modulators IM1 and IM2;
an optical isolator OI;
an optical circulator OC;
a low-frequency photodiode PD;
a lock-in amplifier LD;
a radio-frequency mixer RFM for the generation of the reference signal at low-frequency $f_m = f_1 - f_2$.

Figure 3:
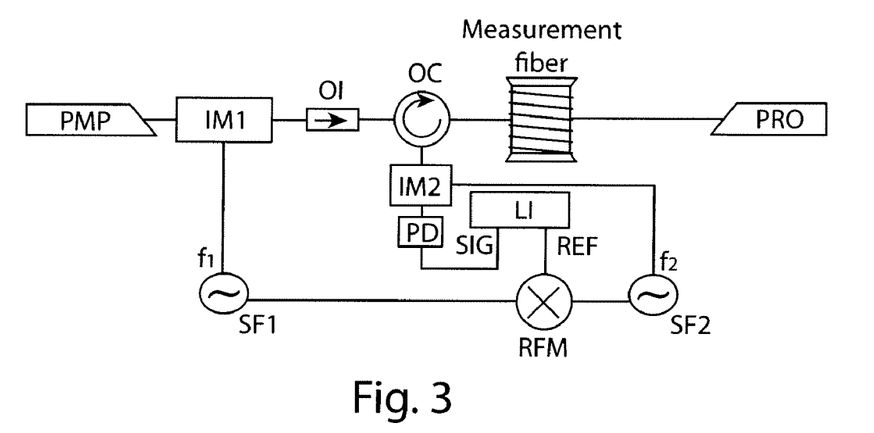
FIG. 3 shows the block diagram of the Brillouin shift measuring setup, based on the technique according to the invention, in its second embodiment.

The second embodiment of the method subject-matter of the present invention can be implemented by means of the optoelectronic apparatus schematically illustrated in FIG. 3.

Such an apparatus provides the same set of components used for the carrying-out of the technique in its first embodiment, i.e.:

a PMP laser for the generation of the optical pump signal;
a tunable laser PRO for the generation of the optical probe signal;
a first optical modulator of intensity IM1, for the modulation at frequency $f_1$ of the pump signal;
a second optical modulator of intensity IM2, for the modulation at frequency $f_2$ of the probe signal exiting the fiber;
two radio-frequency generators for the steering of the modulators IM1 and IM2;
an optical isolator OI;
an optical circulator OC;
a low-frequency photodiode PD;
a lock-in amplifier;
a radio-frequency mixer RFM for the generation of the reference signal at low-frequency $f_m = f_1 - f_2$.

Figure 4:
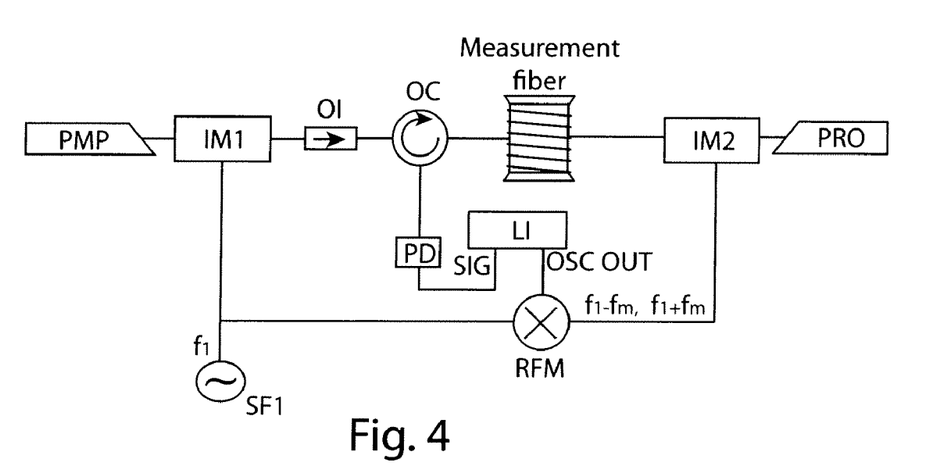
FIG. 4 shows the block diagram of the Brillouin shift measuring setup, based on the technique according to the invention, in its third embodiment.

The third embodiment of the method subject-matter of the present invention can be implemented by means of the optoelectronic apparatus schematically illustrated in FIG. 4.

Such an apparatus provides the same set of components used for the carrying-out of the technique in its first embodiment, i.e.:

a laser (PMP) for the generation of the optical pump signal;
a tunable laser (PRO) for the generation of the probe optical signal;
a first optical modulator of intensity (IM1), for the modulation at frequency $f_1$ of the pump signal;
a second optical modulator of intensity (IM2), for the simultaneous modulation at frequencies $f_2$ and $f_3$ of the probe signal before the launch in the fiber;
a radio-frequency generator for the steering of modulator (IM1);
a lock-in amplifier (LI);
a radio-frequency mixer (RFM) for the generation of the two modulating frequencies $f_2$ and $f_3$ steering the modulator (IM2).

The inventors have carried out some experimental tests by using the apparatus of FIG. 2. The tests have been effectuated by using a measurement fiber constituted by a first stretch of 100 meters length, and a second stretch of around 30 m length with different Brillouin shift, and finally a third stretch of around 100 m length having a Brillouin shift equal to that of the first stretch. The total measurement length was therefore of around 230 m.

The measurements have been carried out choosing a step for the frequencies scanning equal to $\Delta f = 100$ kHz, which satisfies the above relationship (10), and a maximum modulation frequency $f_{max} = 5$ MHz. The frequency differences $f_1 - f_2$ has been fixed as $f_m = 500$ Hz.

The frequency shift between the pump light and the probe light has been made vary from v=10940 MHz, with 5 MHz step, for which $N_{Shift} = 53$ transfer functions have been acquired. The range of frequency shift between pump and probe has been chosen on the basis that the fiber stretches of 100 m length had a nominal Brillouin shift equal to 10860 MHz.

The measurements so acquired have been elaborated according to the classical reconstruction technique based on fitting with theoretical Laurentian curve and that has been above described.

Figure 5:
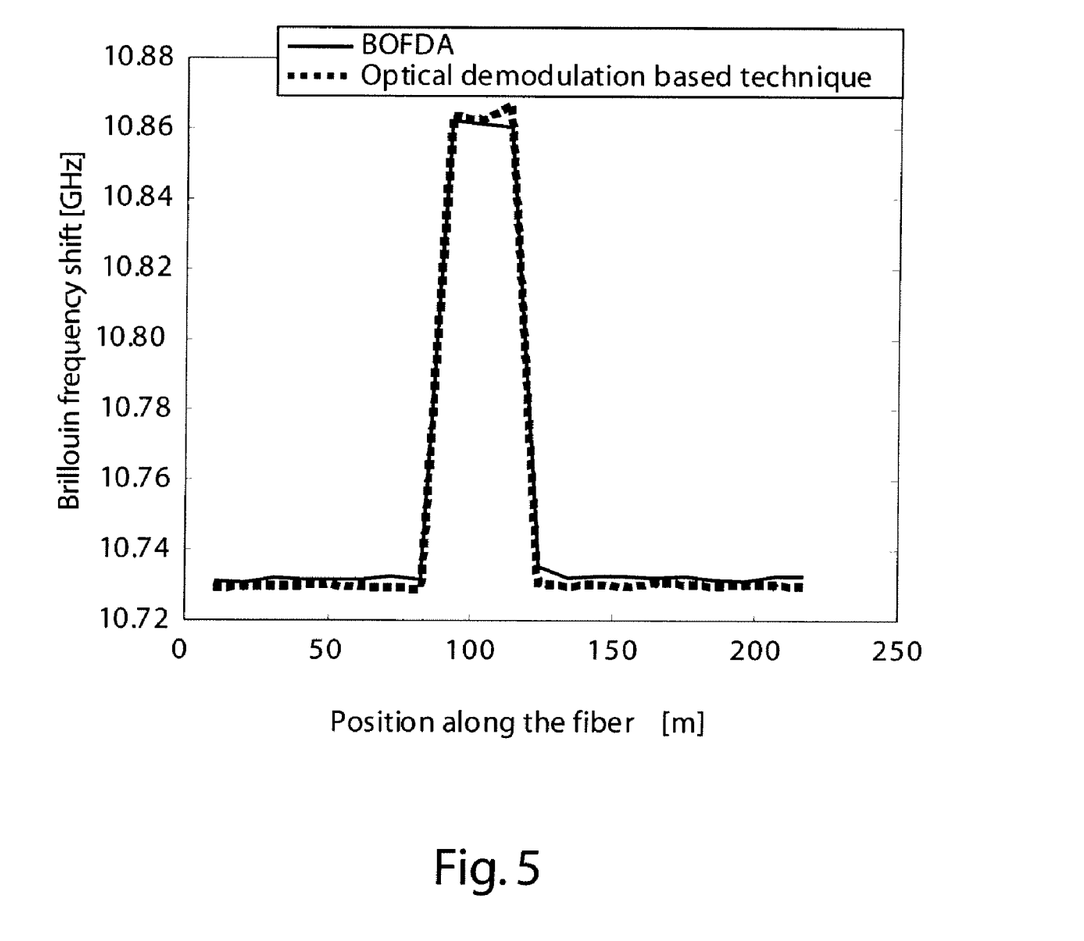
FIG. 5 shows an example of measurement realized by the Inventors by using the setup of FIG. 2, compared with the measurement obtained according to the traditional setup of FIG. 1.

In order to evaluate the quality of the obtained measurement, the shift Brillouin distribution has been measured afterwards for the same measurement fiber, by using this time a BOFDA apparatus of the type shown in FIG. 1. Even in this case, the data that have been measured in the frequency domain have been first transformed in the time domain and then elaborated by means of the same fitting technique. In FIG. 5, the comparison between the distribution measured with the apparatus of FIG. 2 and that measured with the apparatus of FIG. 3 is reported. One observes the consistency between the two results.

The method according to the present invention allows on one hand to maintain the advantages of a synchronous reception of the signals, peculiar to the techniques that operate in the frequency domain, and on the other hand it allows the obtaining of high spatial resolutions without for this reason implying the use of a wide-band network analyzer and of high speed photodiodes. These advantages allow, after all, the possibility of realizing experimental measurement apparatuses with high performances and higher compactness with respect to the classical ones.

The preferred embodiments have been above described and some modifications of this invention have been suggested, but it should be understood that those skilled in the art can make embodiments and changes, without so departing from the related scope of protection, as defined by the following claims.

The invention claimed is:

1. A method for measuring the Brillouin shift distribution in optical fiber, comprising the launch of an optical pump signal from one end of the measurement fiber and an optical probe signal from the other end of the fiber, including:

A. launching a pump signal with an intensity that is sum of a continuous component and a sinusoidal component at frequency $f_1$, $I_{Pump}(z=0,t)=I_{Pu0}(1+m_1 \cos(2\pi f_1 t+\phi_1))$, and an optical probe signal with an intensity which is sum of a continuous component and a sinusoidal component at frequency $f_2$, $I_{Probe}(z=L,t)=I_{Pr0}(1+m_2 \cos(2\pi f_2 t+\phi_2))$, said two frequencies $f_1$ and $f_2$ differing of a predefinable quantity $f_m$ such that:

$$f_1-f_2=f_m \text{ and } f_m<<f_1, f_2$$

L representing the total length of the measurement fiber, whilst $\phi_1$ and $\phi_2$ are two initial arbitrary phases, holding moreover the following relationship: $m_1, m_2<<1$;

B. measuring of the component at frequency $f_m$ which is present in the intensity spectrum of the probe signal at the exit of the measurement fiber, C. repeating the phases A and B with varying $f_1$ and $f_2$ frequencies, with the above-mentioned constraints;

D. repeating the phases from A to C, for a pre-determinable number of shifts at frequency $v_i$, $i=1,\ldots,N_{shift}$, between the optical carrier of the probe signal and the optical carrier of the pump signal, and obtaining the correspondent transfer functions $H(f, v_i)$ at frequency $f \approx f_1 \approx f_2$;

E. elaborating the transfer functions obtained at the end of step D, in order to reconstruct the Brillouin shift distribution along the measurement fiber.

2. A method according to claim 1, wherein the elaboration in step E is carried out by Fourier anti-transforming operations and subsequent fitting with theoretical curves of Lorenzian type.

3. An optoelectronic measurement apparatus for distributed measurements of the Brillouin shift in optical fiber, wherein it implements the method according to claim 2 comprising:

a laser (PMP) for the generation of the optical pump signal;
a tunable laser (PRO) for the generation of the probe optical signal;
a first optical modulator of intensity (IM1), for the modulation at frequency $f_1$ of the pump signal;
a second optical modulator of intensity (IM2), for the modulation at frequency $f_2$ of the probe signal before the launch in the fiber;
two radio-frequency generators for the steering of modulators (IM1) and (IM2);
a lock-in amplifier (LI);
a radio-frequency mixer (RFM) for the generation of the reference signal at low-frequency $f_m=f_1-f_2$.

4. A method according to claim 1, wherein in step C one uses a number $N_f$ of modulation frequencies $f_1$ and $f_2$, that is:

$$f_1=\{f_{1i}\}_{i=0,1,\ldots N_f-1}$$

$$f_2=\{f_{2i}\}_{i=0,1,\ldots N_f-1}$$

where:

$$f_{1i}=f_{min}+i\Delta f\, i=0,1,\ldots N_f-1$$

$$f_{2i}=f_{1i}+f_m\, i=0,1,\ldots N_f-1$$

where $\Delta f$ is a predefinable quantity.

5. A method according to claim 4, wherein $\Delta f$ must satisfy the relationship:

$$\Delta f < \frac{v}{2L}$$

where v is the propagation speed of the optical signals in the fiber, and L is the fiber length.

6. A method according to claim 5, wherein the highest and lowest frequencies used in step C, $f_{max}$ and $f_{min}$, define the maximum spatial resolution $\Delta z$ with which the distributed measurement of the Brillouin shift is carried out, according to the formula:

$$\Delta z = \frac{v}{2} \frac{1}{f_{max}-f_{min}}$$

7. An optoelectronic measurement apparatus for distributed measurements of the Brillouin shift in optical fiber, wherein it implements the method according to claim 6 comprising:

a laser (PMP) for the generation of the optical pump signal;
a tunable laser (PRO) for the generation of the probe optical signal;
a first optical modulator of intensity (IM1), for the modulation at frequency $f_1$ of the pump signal;
a second optical modulator of intensity (IM2), for the modulation at frequency $f_2$ of the probe signal before the launch in the fiber;
two radio-frequency generators for the steering of modulators (IM1) and (IM2);
a lock-in amplifier (LI);
a radio-frequency mixer (RFM) for the generation of the reference signal at low-frequency $f_m=f_1-f_2$.

8. An optoelectronic measurement apparatus for distributed measurements of the Brillouin shift in optical fiber, wherein it implements the method according to claim 1 and it comprises:

a laser (PMP) for the generation of the optical pump signal;
a tunable laser (PRO) for the generation of the probe optical signal;
a first optical modulator of intensity (IM1), for the modulation at frequency $f_1$ of the pump signal;

a second optical modulator of intensity (IM2), for the modulation at frequency $f_2$ of the probe signal before the launch in the fiber;
two radio-frequency generators for the steering of modulators (IM1) and (IM2);
a lock-in amplifier (LI);
a radio-frequency mixer (RFM) for the generation of the reference signal at low-frequency $f_m=f_1-f_2$.

9. The apparatus according to claim 8, comprising:
an optical isolator (OI);
an optical circulator (OC);
a low-frequency photodiode (PD).

10. A method for measuring the Brillouin shift distribution in optical fiber, comprising the launch of an optical pump signal from one end of the measurement fiber and an optical probe signal from the other end of the fiber, including:

A'. launching a pump signal with an intensity that is sum of a continuous component and a sinusoidal component at frequency $f_1$, $I_{Pompa}(z=0,t)=I_{Pu0}(1+m_1 \cos(2\pi f_1 t+\phi_1))$, and an optical probe signal with an intensity constituted by a continuous component, $I_{Probe}(z=L,t)=I_{Pr0}$, L representing the total length of the measurement fiber, while $\phi_1$ is an initial arbitrary phase, holding moreover the following relationship: $m_1 \ll 1$;

AA'. modulating in intensity, at frequency $f_2$, the probe signal as it is at the exit of the measurement fiber at z=L in step A', $f_2$ differing from frequency $f_1$ of a fixed pre-definable quantity $f_m$ such that:

$$f_1-f_2=f_m \text{ and } f_m \ll f_1, f_2$$

B. measuring the component at frequency $f_m$ which is present in the intensity spectrum of the probe signal at the exit of the measurement fiber, C. repeating steps A' to B with varying $f_1$ and $f_2$ frequencies, with the above-mentioned constraints;

D. repeating steps A' to C, for a pre-determinable number of shifts at frequency $v_i$, i=1, ..., $N_{shift}$, between the optical carrier of the probe signal and the optical carrier of the pump signal, and obtaining the correspondent transfer functions;

E. elaborating the transfer functions obtained at the end of step D, in order to reconstruct the Brillouin shift distribution along the measurement fiber.

11. An optoelectronic measurement apparatus for distributed measurements of the Brillouin shift in optical fiber, wherein it implements the method according to claim 10 and it comprises:
a laser (PMP) for the generation of optical pump signal;
a tunable laser (PRO) for the generation of the probe optical signal;
a first optical modulator of intensity (IM1), for the modulation at frequency $f_1$ of the pump signal;
a second optical modulator of intensity (IM2), for the modulation at frequency $f_2$ of the probe signal before the launch in the fiber;
two radio-frequency generators for the steering of modulators (IM1) and (IM2);
a lock-in amplifier (LI);
a radio-frequency mixer (RFM) for the generation of the reference signal at low-frequency $f_m=f_1-f_2$.

12. The apparatus according to claim 11, comprising:
an optical isolator (OI);
an optical circulator (OC);
low-frequency photodiode (PD).

13. A method for measuring the Brillouin shift distribution in optical fiber, comprising the launch of an optical pump signal from one end of the measurement fiber and an optical probe signal from the other end of the fiber, including:

A1. launching a pump signal with an intensity that is sum of a continuous component and a sinusoidal component at frequency $f_1$, $I_{Pompa}(z=0,t)=I_{Pu0}(1+m_1 \cos(2\pi f_1 t+\phi_1))$, and an optical probe signal with an intensity that is sum of a continuous component and two sinusoidal components at frequencies $f_2$ and $f_3$,
$I_{Probe}(z=L,t)=I_{Pr0}(1+m_2 \cos(2\pi f_2 t+\phi_2)+m_3 \cos(2\pi f_3 t+\phi_3))$, said three frequencies $f_1$, $f_2$ and $f_3$ related by the following relations:

$$f_2=f_1-f_m, f_3=f_1+f_m \text{ and } f_m \ll f_1, f_2$$

L representing the total length of the measurement fiber, whilst $\phi_1$, $\phi_2$ and $\phi_3$ are three initial arbitrary phases, holding moreover the following relationship: $m_1$, $m_2$, $m_3 \ll 1$;

B. measuring the component at frequency $f_m$ which is present in the intensity spectrum of the probe signal at the exit of the measurement fiber, C. repeating steps A1 to B with varying the $f_1$ frequency, with the above-mentioned constraints;

D. repeating steps A1 to C, for a pre-determinable number of shifts at frequency $v_i$, i=1, ..., $N_{shift}$, between the optical carrier of the probe signal and the optical carrier of the pump signal, and obtaining the correspondent transfer functions;

E. elaborating the transfer functions obtained at the end of step D, in order to reconstruct the Brillouin shift distribution along the measurement fiber.

14. An optoelectronic measurement apparatus for distributed measurements of the Brillouin shift in optical fiber, wherein it implements the method according to claim 13 and it comprises:
a laser (PMP) for the generation of the optical pump signal;
a tunable laser (PRO) for the generation of the probe optical signal;
a first optical modulator of intensity (IM1), for the modulation at frequency $f_1$ of the pump signal;
a second optical modulator of intensity (IM2), for the simultaneous modulation at frequencies $f_2$ and $f_3$ of the probe signal before the launch in the fiber;
a radio-frequency generator for the steering of modulator (IM1);
a lock-in amplifier (LI);
a radio-frequency mixer (RFM) for the generation of the two modulating frequencies $f_2$ and $f_3$ steering the modulator (IM2).

15. The apparatus according to claim 14, comprising:
an optical isolator (OI);
an optical circulator (OC);
low-frequency photodiode (PD).

* * * * *